(12) United States Patent
Carsello et al.

(10) Patent No.: US 6,529,566 B1
(45) Date of Patent: Mar. 4, 2003

(54) METHOD AND APPARATUS FOR FACILITATING A CLASSIFICATION OF A BASEBAND SIGNAL

(75) Inventors: Stephen Rocco Carsello, Plantation, FL (US); Metin Bayram, Bedford, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/387,090

(22) Filed: Aug. 31, 1999

(51) Int. Cl.[7] .............................................. H04L 27/06
(52) U.S. Cl. ...................................................... 375/340
(58) Field of Search ................................. 375/340, 316, 375/359, 360, 361; 340/7.32; 455/343

(56) References Cited

U.S. PATENT DOCUMENTS

| | | | | |
|---|---|---|---|---|
| 3,571,522 A | * | 3/1971 | Cox | 370/526 |
| 4,914,398 A | * | 4/1990 | Jove et al. | 361/111 |
| 5,675,612 A | * | 10/1997 | Solve et al. | 375/326 |
| 5,832,038 A | | 11/1998 | Carsello | 375/316 |

* cited by examiner

Primary Examiner—Chi Pham
Assistant Examiner—Kevin M Burd
(74) Attorney, Agent, or Firm—R. Louis Breeden; Matthew C. Loppnow

(57) ABSTRACT

A processor (202) delays (906) a baseband digital signal by a symbol duration, thereby generating a delayed baseband digital signal. The processor adds (908) the baseband digital signal to the delayed baseband digital signal, thereby generating a summed signal; and divides (910) the summed signal by two, thereby generating a threshold signal. The processor also delays (912) the baseband digital signal by one-half the symbol duration, thereby generating a half-delayed signal; and subtracts (914) the threshold signal from the half-delayed signal, thereby generating a candidate signal. In addition, the processor searches (916) for a zero crossing in the candidate signal, and generates (918) a pulse in response to finding the zero crossing.

15 Claims, 5 Drawing Sheets

400

500

600

METHOD AND APPARATUS FOR FACILITATING A CLASSIFICATION OF A BASEBAND SIGNAL

FIELD OF THE INVENTION

This invention relates in general to wireless communication systems, and more specifically to a method and apparatus for facilitating a classification of a baseband signal.

BACKGROUND OF THE INVENTION

Some portable communication receivers are required to operate in communication systems using different transmission baud rates and different levels of modulation. Such receivers require a signal classifier to determine whether they are receiving a signal with which they can operate. The signal classifier generally comprises a baud rate detector and a modulation level detector.

Prior-art signal classifiers have utilized a zero-crossing detector to monitor a received down-converted baseband signal for baud rate detection. The baud rate detector has required the use of a peak and valley detector to establish thresholds for zero crossings. When local oscillator error is present, the peak and valley detector requires extra settling time before it can reliably estimate the zero point in the signal, thus decreasing battery life and increasing latency. For multi-level signaling, transitions occur which do not cross zero, and are therefore not detected by a zero-crossing detector. Also, the zero crossings are smeared by multi-level signals, and the performance of the detector degrades. In addition, prior-art signal classifiers have been known to false on noise. Prior-art signal classifiers also have required substantial computation for level detection.

Thus, what is needed is a method and apparatus in a signal classifier for facilitating a classification of a baseband signal. The method and apparatus preferably will require no peak and valley detector, will detect all transitions accurately without smearing, will not false on noise, and will minimize the computation required for level detection.

SUMMARY OF THE INVENTION

An aspect of the present invention is a method in a signal classifier for facilitating a classification of a baseband digital signal. The method comprises the steps of receiving the baseband digital signal; and delaying the baseband digital signal by a symbol duration, thereby generating a delayed baseband digital signal. The method further comprises the steps of adding the baseband digital signal to the delayed baseband digital signal, thereby generating a summed signal; and dividing the summed signal by two, thereby generating a threshold signal. The method also includes the steps of delaying the baseband digital signal by one-half the symbol duration, thereby generating a half-delayed signal; and subtracting the threshold signal from the half-delayed signal, thereby generating a candidate signal. In addition, the method includes the steps of searching for a zero crossing in the candidate signal, and generating a pulse in response to finding the zero crossing.

Another aspect of the present invention is a signal classifier for facilitating a classification of a baseband signal. The signal classifier comprises a processor for receiving and processing the baseband signal. The processor is arranged and programmed to digitize the baseband signal, thereby generating a baseband digital signal, and to delay the baseband digital signal by a symbol duration, thereby generating a delayed baseband digital signal. The processor is further arranged and programmed to add the baseband digital signal to the delayed baseband digital signal, thereby generating a summed signal; and to divide the summed signal by two, thereby generating a threshold signal. The processor is also arranged and programmed to delay the baseband digital signal by one-half the symbol duration, thereby generating a half-delayed signal; and to subtract the threshold signal from the half-delayed signal, thereby generating a candidate signal. In addition, the processor is arranged and programmed to search for a zero crossing in the candidate signal, and to generate a pulse in response to finding the zero crossing.

Another aspect of the present invention is a receiver for facilitating a classification of a baseband signal. The receiver comprises a receiver front end for down-converting a received modulated signal to produce the baseband signal, and a signal classifier for facilitating a classification of the baseband signal. The signal classifier comprises a processor for receiving and processing the baseband signal. The processor is arranged and programmed to digitize the baseband signal, thereby generating a baseband digital signal, and to delay the baseband digital signal by a symbol duration, thereby generating a delayed baseband digital signal. The processor is further arranged and programmed to add the baseband digital signal to the delayed baseband digital signal, thereby generating a summed signal; and to divide the summed signal by two, thereby generating a threshold signal. The processor is also arranged and programmed to delay the baseband digital signal by one-half the symbol duration, thereby generating a half-delayed signal; and to subtract the threshold signal from the half-delayed signal, thereby generating a candidate signal. In addition, the processor is arranged and programmed to search for a zero crossing in the candidate signal, and to generate a pulse in response to finding the zero crossing.

DETAILED DESCRIPTION OF THE INVENTION

Figure 1:
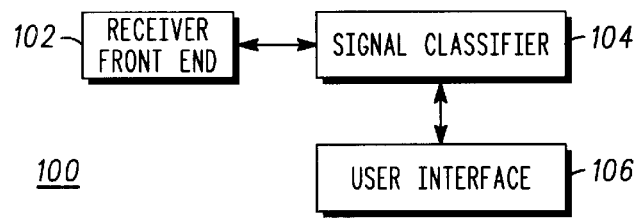
FIG. 1 is an electrical block diagram of an exemplary receiver in accordance with the present invention.

FIG. 1 is an electrical block diagram of an exemplary receiver 100 in accordance with the present invention. The receiver 100 comprises a conventional receiver front end 102 for down-converting a received modulated signal to produce a baseband signal. The receiver 100 further comprises a signal classifier 104 in accordance with the present invention for facilitating a classification of the baseband signal, i.e., for determining whether the baseband signal is operating at the correct baud rates, e.g., 1600 and 3200 baud, and modulation levels, e.g., 2-level and 4-level, for the receiver 100. In one embodiment, the receiver 100 also includes a user interface 106 for interfacing with a user. The user interface 106 comprises, for example, a conventional display, such as a liquid crystal display, a conventional keyboard, and a conventional alerting device. The exemplary receiver 100 is intended to operate in a conventional wireless communication system, such as a two-way messaging system, using a synchronous protocol, such as Motorola's well-known FLEX™ two-way messaging protocol. It will be appreciated that other types of wireless communication systems and other types of protocols can be utilized as well in accordance with the present invention.

Figure 2:
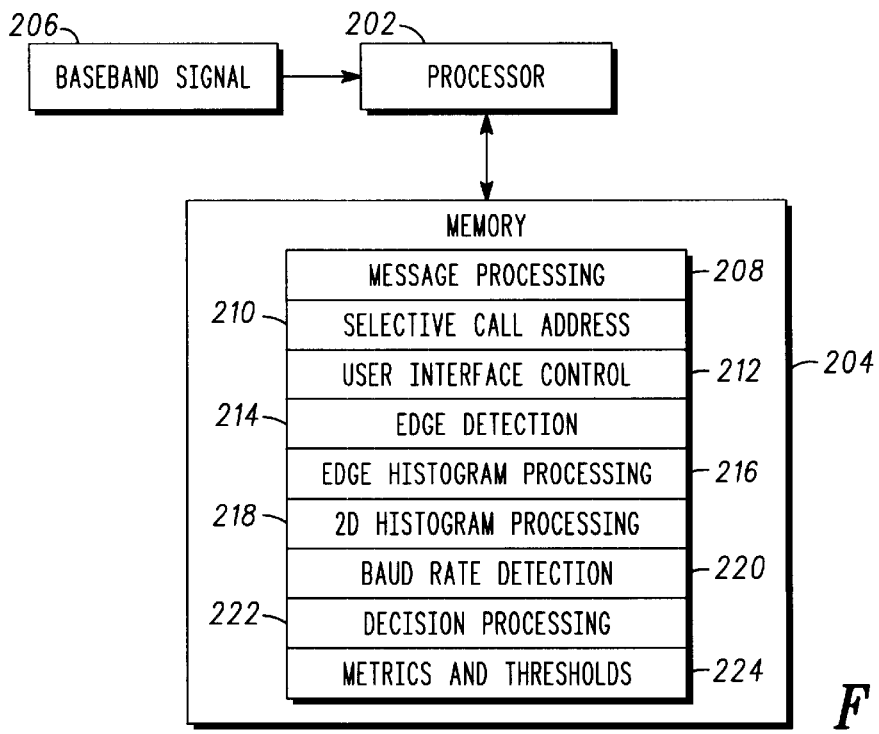
FIG. 2 is an electrical block diagram of an exemplary signal classifier in accordance with the present invention.

FIG. 2 is an electrical block diagram of an exemplary signal classifier 104 in accordance with the present invention. The signal classifier 104 comprises a processor 202 for receiving and digitizing the baseband signal 206 from the receiver front end 102 to produce a baseband digital signal for further processing by the processor 202. The processor is preferably a conventional digital signal processor (DSP), such as the DSP 1615 processor manufactured by Lucent Technologies. It will be appreciated that other similar DSPs can be utilized as well for the processor 202. The signal classifier 104 further comprises a memory 204 for storing software and operating variables and constants used in accordance with the present invention. It will be appreciated that some or all of the memory 204 can be included as an integral part of the processor 202, and that all or part of the processor 202 and the memory 204 can be manufactured as a custom integrated circuit, as well.

The memory 204 comprises a message processing program 208 for programming the processor 202 to process messages through well-known techniques. The memory 204 further comprises a selective call address 210 to which the receiver 100 is responsive. In one embodiment, the memory 204 also includes a user interface control program 212 for programming the processor 202 to interface with a user through the user interface 106. In addition, the memory 204 includes an edge detection program 214 for programming the processor 202 to detect transitions at the edges of adjacent symbols in accordance with the present invention. The memory 204 further comprises an edge histogram processing program 216 for programming the processor 202 to generate an edge histogram representing a count of transition edges occurring at each sampling phase for a plurality of symbols in a predetermined portion of the baseband signal 206 after digitization.

In addition, the memory 204 includes a two-dimension histogram processing program 218 for programming the processor 202 to generate a two-dimension histogram of occurrences of levels at each of the plurality of symbol sampling phases of the baseband digital signal. The memory 204 further includes a baud rate detection program 220 for programming the processor 202 to determine whether the baseband signal is operating a baud rate suitable for the receiver 100. The memory also includes a decision processing program 222 for programming the processor to compute metrics and to compare the metrics with predetermined thresholds in order to make additional decisions in accordance with the present invention. In addition, the memory 204 includes space for storing the metrics and thresholds utilized in accordance with the present invention.

Figure 3:
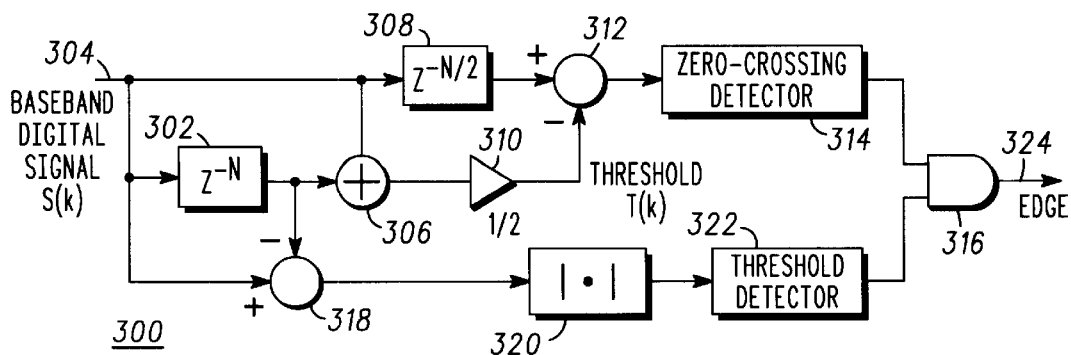
FIG. 3 is an electrical block diagram of an exemplary edge detector in accordance with the present invention.

FIG. 3 is an electrical block diagram of an exemplary edge detector 300 in accordance with the present invention. While the edge detector 300 can be constructed in hardware, it is preferably achieved in the processor 202 through software readily created by one of ordinary skill in the art, given the teachings of this disclosure. It would be desirable to look for threshold crossings based on the actual symbols that are received. However, when the receiver 100 first powers up to look at the signal, the receiver 100 is completely asynchronous, with no knowledge of symbol timing or DC offset. In an FSK system, for example, which employs discriminator detection, this DC offset is proportional to the frequency offset of the receiver. What is needed is a threshold crossing detector which does not need any information about DC offset or symbol timing. This is accomplished with the edge detector 300.

The baseband digital signal S(k) at the input 304 is added in an adder 306 to a delayed version of itself (delayed by element 302), where the delay N is equal to the symbol duration at the desired baud rate, e.g., 3200 baud. Dividing the sum by 2 (element 310) results in a threshold signal T(k) which represents the midpoint between the signal S(k) and the symbol-delayed version of itself. We know that this threshold signal represents the symbol-crossing threshold at the true edge of the waveform. Therefore, a delayed signal S(k-N/2) from the element 308 should cross the threshold signal at the transition point. The threshold crossing is found by subtracting T(k) from S(k-N/2) in element 312 and looking for a zero crossing, using a zero-crossing detector 314. Note the addition of the subtractor 318, the absolute function 320, and the threshold detector 322, which are used to eliminate repeated symbols. When repeated symbols occur, it is likely that S(k-N/2) and T(k) will cross, so we require that the absolute change from one symbol to the next is sufficiently large, otherwise the AND gate 316 prevents the pulse from the zero-crossing detector 314 from reaching the output 324.

Figure 4:
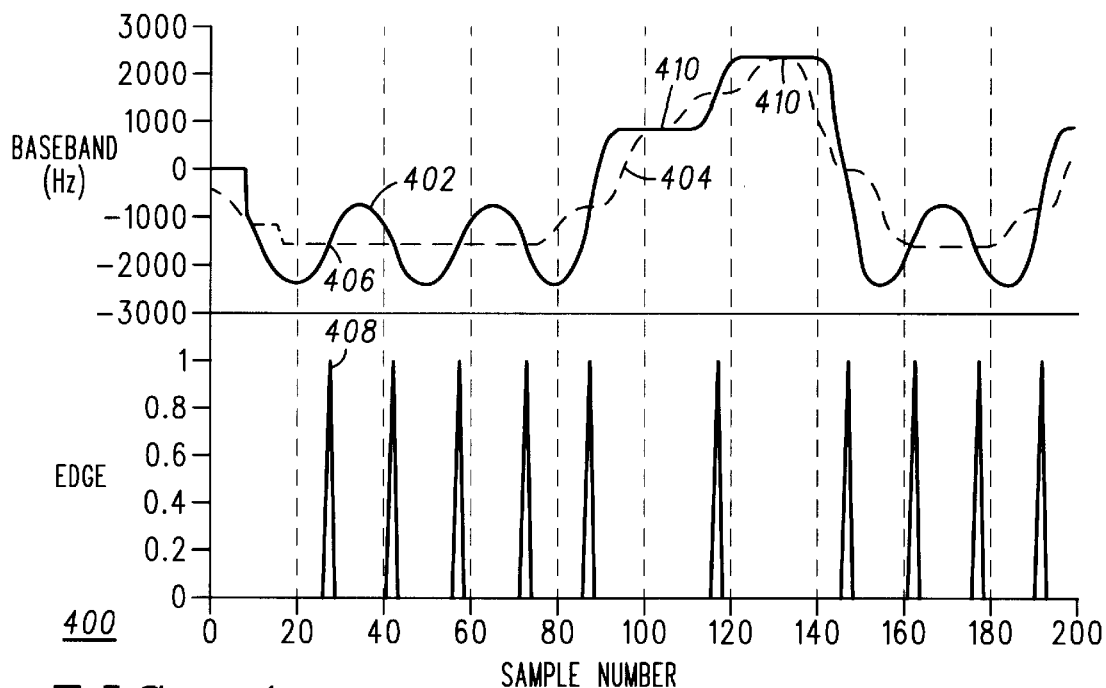
FIG. 4 is a timing diagram depicting operation of the edge detector in accordance with the present invention.

FIG. 4 is a timing diagram 400 depicting operation of the edge detector in accordance with the present invention. The timing diagram 400 includes the delayed signal S(k-N/2) 402 and the threshold signal T(k) 404. The diagram 400 shows that an edge pulse 408 is present at the output 324 whenever the delayed signal 402 and the threshold signal 404 cross, such as at the point 406, provided that the symbol value has changed. Note also that where the delayed signal 402 and the threshold signal 404 cross, and there has not been a change in symbol value, such as at the points 410, there is no corresponding edge pulse.

Figure 5:
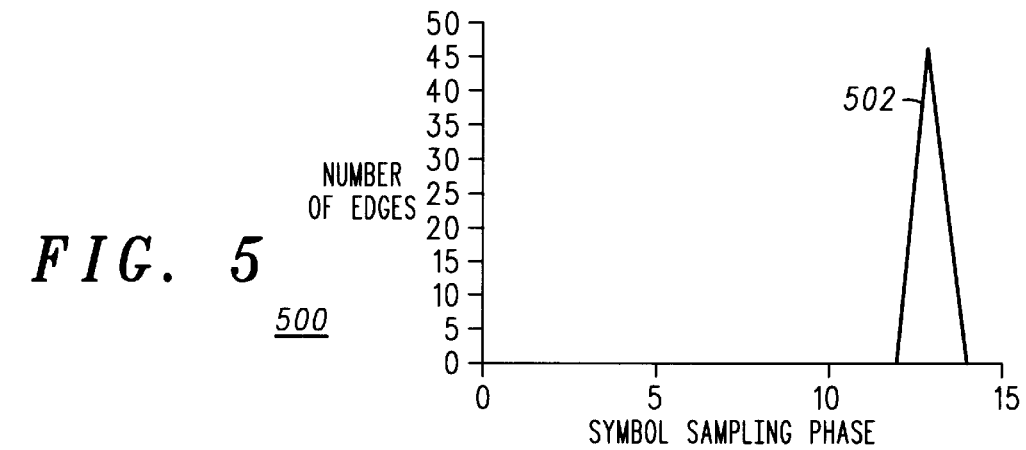
FIG. 5 is an exemplary edge histogram depicting detected symbol edges versus sampling phase for two-level modulation in accordance with the present invention.

FIG. 5 is an exemplary edge histogram 500 depicting detected symbol edges versus sampling phase for two-level modulation in accordance with the present invention. Here, the symbol duration N is 15 sampling phases. Note that by searching for the peak 502 the signal classifier 104 can ascertain the sampling phase which corresponds to the symbol edges. Since the duration of the desired symbols is known, the phase of the symbol center can also be estimated.

Figure 6:
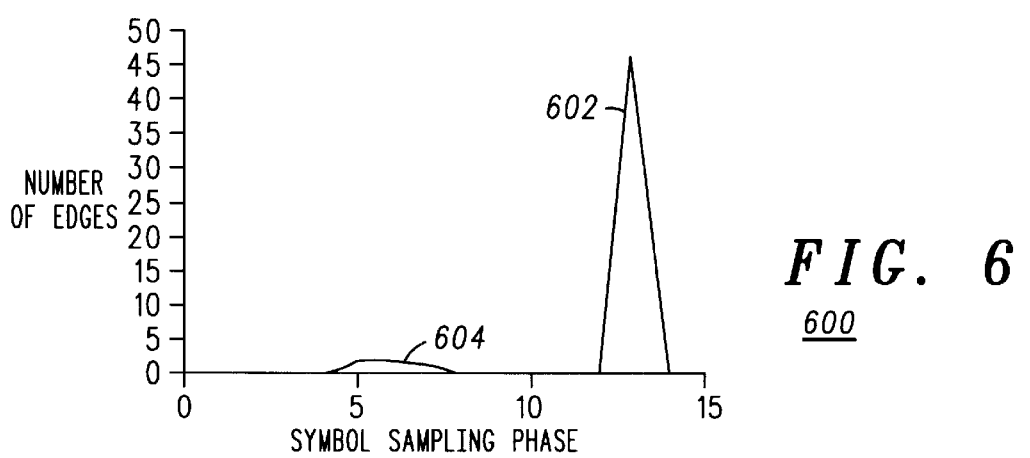
FIG. 6 is an exemplary edge histogram depicting detected symbol edges versus sampling phase for four-level modulation in accordance with the present invention.

FIG. 6 is an exemplary edge histogram 600 depicting detected symbol edges versus sampling phase for four-level modulation in accordance with the present invention. Here, the symbol duration N also is 15 sampling phases. Note the peak 602, corresponding to the sampling phase of the symbol edges, as well as a few false edges 604 near the symbol centers.

Figure 7:
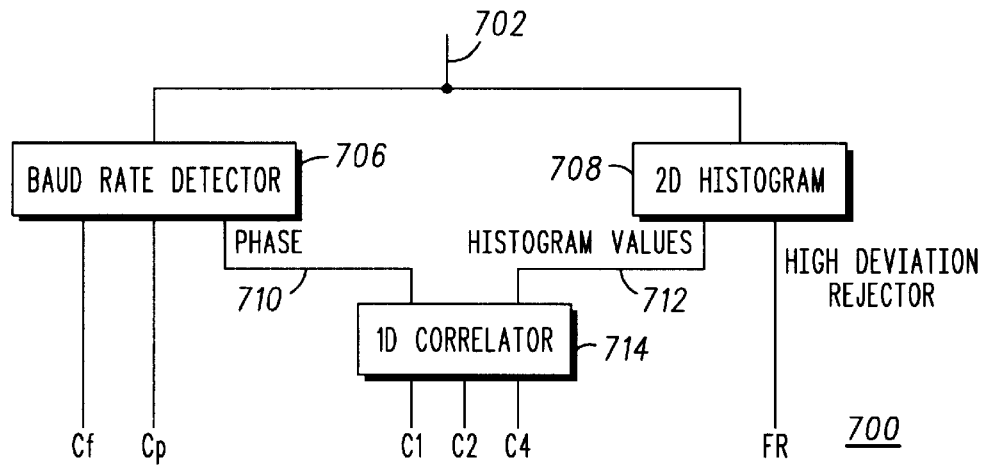
FIG. 7 is an exemplary architecture diagram of a first portion of a decision process in accordance with the present invention.

FIG. 7 is an exemplary architecture diagram 700 of a first portion of a decision process in accordance with the present invention. The baseband digital signal is coupled to the input 702 and is fed to a baud rate detector 706, comprising the edge detector 300. The baseband digital signal is also fed to a 2D histogram element 708, calculated as in U.S. Pat. No. 5,832,038 issued Nov. 3, 1998 to Carsello, which is hereby incorporated herein by reference. A one-dimension correlator 714 is coupled to the baud rate detector 706 for receiving therefrom the sampling phase 710 of the symbol centers. The one-dimension correlator 714 is further coupled to the 2D histogram element 708 for receiving histogram values 712 corresponding to the sampling phase 710.

The baud rate detector 706 computes a peak metric Cp and a fringe metric Cf. Cp is computed from the edge histogram 500, 600 as the sum of the largest edge count at any of the sampling phases, plus N counts at sampling phases adjacent to the phase having the largest count, where N is a predetermined integer equal to or greater than zero. Simulations have determined that, when the number of sampling phases per symbol equals ten, a value of N=2 is preferred. It will be appreciated that different sampling rates and different values of N can be used as well, depending upon the requirements of the communication system. The fringe metric Cf is computed by dividing the peak metric Cp by the sum of the counts of the edge histogram 500, 600 at all phases which were not used in determining Cp.

The 1D correlator 714 computes correlation metrics C1, C2, and C4, corresponding, respectively, to the correlation of one-level, two-level, and four-level correlation vectors with the 2D histogram values at the known sampling phase 710, through well-known techniques. Using the known sampling phase 710 from the baud rate detector 706 advantageously reduces the computations required, compared with prior-art 2D correlation techniques, which had to compute correlation metrics at all sampling phases, and then find the maximum correlation. The 2D histogram element 708 also preferably computes a high deviation rejecter metric FR by summing all values for all sampling phases in the 2D histogram over a window too narrow to accommodate the full bandwidth of an undesired high deviation signal, such as a one-way FLEX signal.

Figure 8:
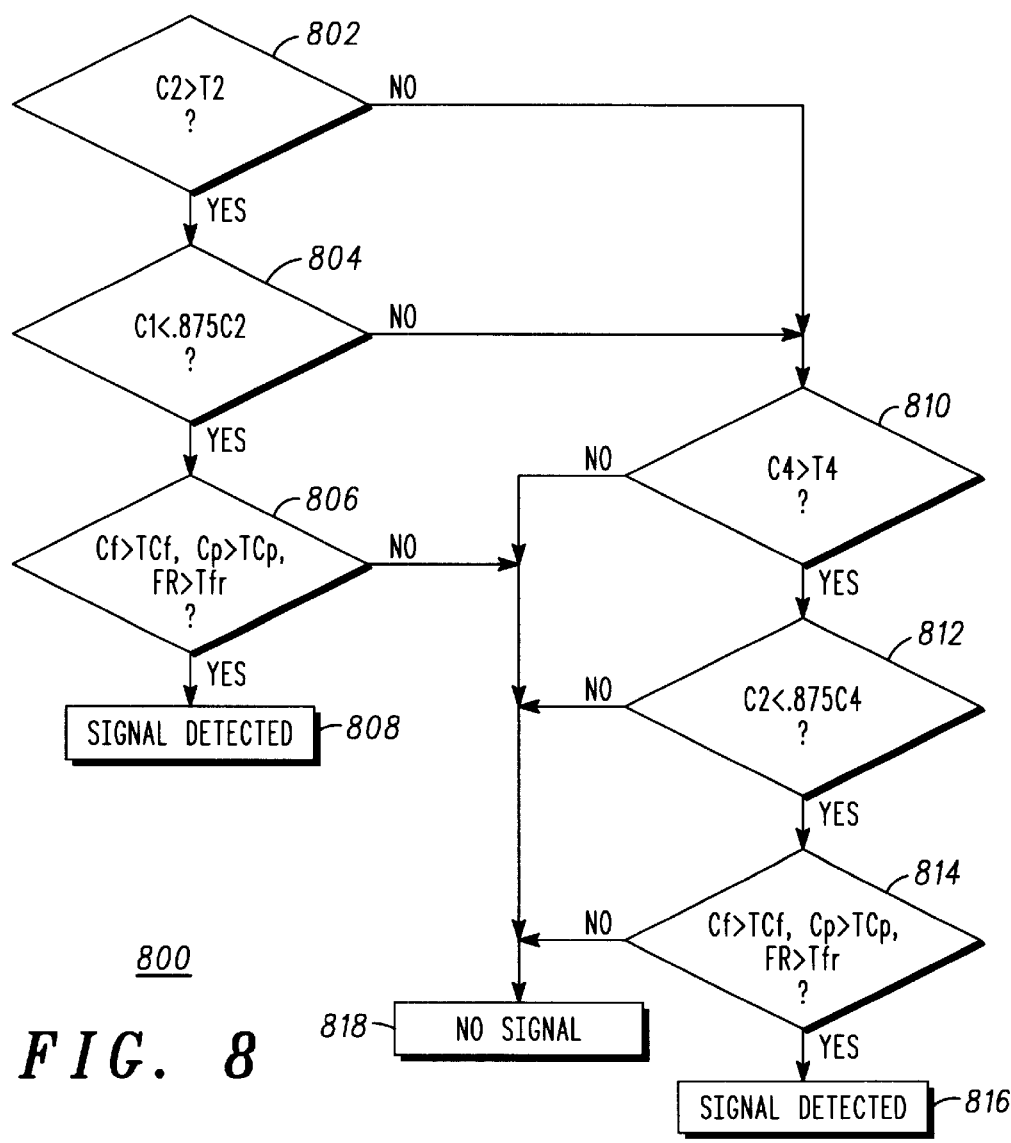
FIG. 8 is an exemplary flow diagram of a second portion of the decision process in accordance with the present invention.

FIG. 8 is an exemplary flow diagram 800 of a second portion of the decision process in accordance with the present invention. The flow begins with step 802, where the processor 202 checks whether the two-level correlation metric C2 is greater than a two-level threshold T2. If so, flow moves to step 804. If not, the flow moves to step 810. At step 804 the processor 202 checks whether the one-level correlation metric C1 is less than 0.875 times C2. If so, the flow moves to step 806. If not, the flow moves to step 810. At step 806 the processor 202 checks whether the fringe metric Cf is greater than a fringe threshold TCf, and whether the peak metric Cp is greater than a peak threshold TCp, and whether the high deviation rejecter metric FR is greater than a rejecter threshold Tfr. If all three conditions are satisfied, the processor 202 decides at step 808 that a valid signal has been detected. If any one or more of the conditions of step 806 are not satisfied, the processor 202 decides at step 818 that no signal of the desired type is present.

At step 810 the processor 202 checks whether the four-level correlation metric C4 is greater than a four-level threshold T4. If so, the flow moves to step 812. If not, the flow moves to step 818, no signal. At step 812 the processor 202 checks whether the two-level correlation metric C2 is less than 0.875 times the four-level correlation metric C4. If so, the flow moves to step 814. If not, the flow moves to step 818, no signal. At step 814, the processor 202 checks whether the fringe metric Cf is greater than the fringe threshold TCf, and whether the peak metric Cp is greater than the peak threshold TCp, and whether the high deviation rejecter metric FR is greater than the rejecter threshold Tfr. If all three conditions are satisfied, the processor 202 decides at step 816 that a valid signal has been detected. If any one or more of the conditions of step 814 are not satisfied, the processor 202 decides at step 818 that no signal of the desired type is present.

Values for the various thresholds compared with the various metrics in the above described decision process were determined empirically. For an observation window of 96 symbols and ten sampling phases per symbol, a set of thresholds which were found to perform well during simulations is: T4=74, T2=80, TCf=2, TCp=17 and Tfr=420. It will be appreciated that the thresholds can be adjusted further, depending on desired performance objectives.

Figure 9:
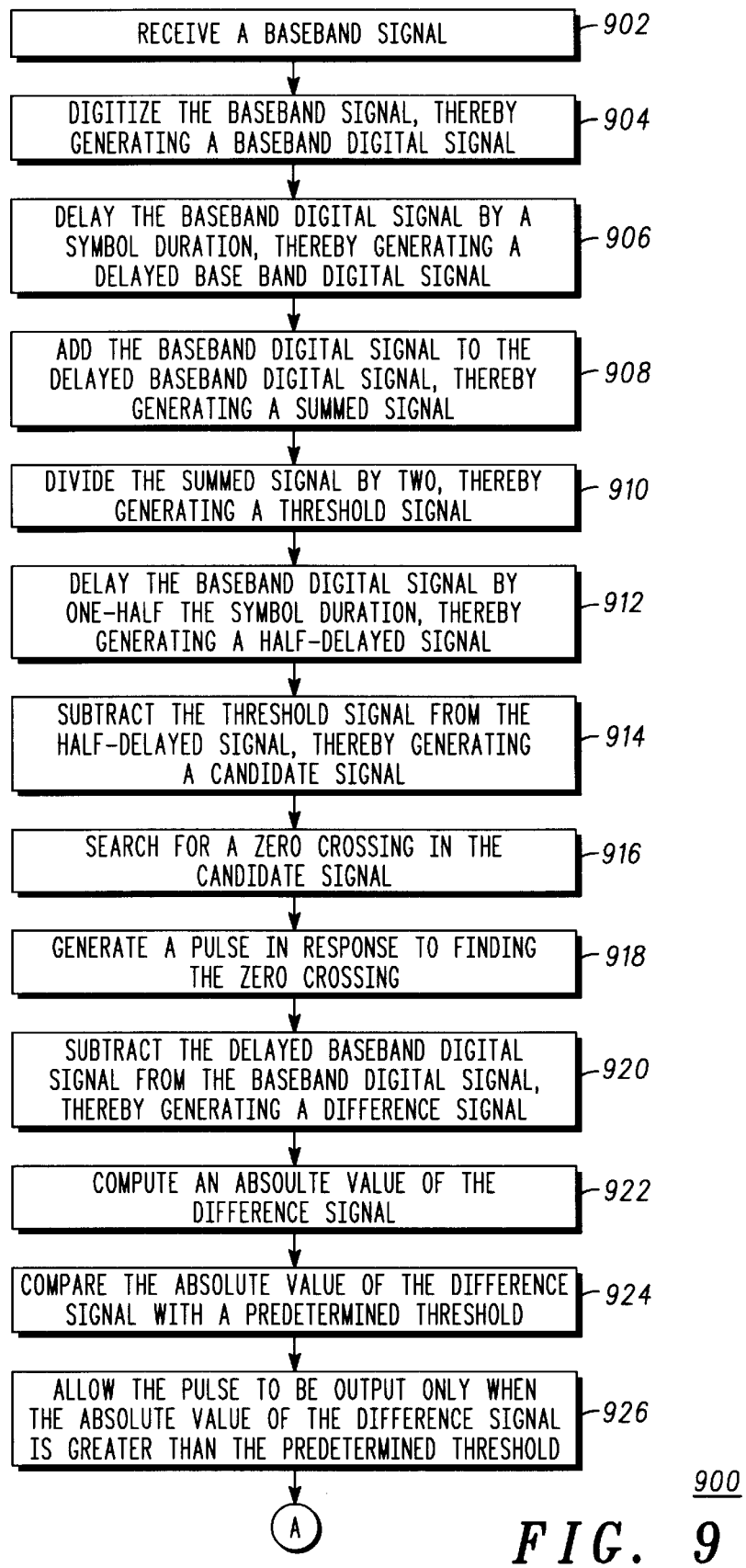
FIGS. 9 and 10 are flow diagrams summarizing operation of the signal classifier in accordance with the present invention.
Figure 10:
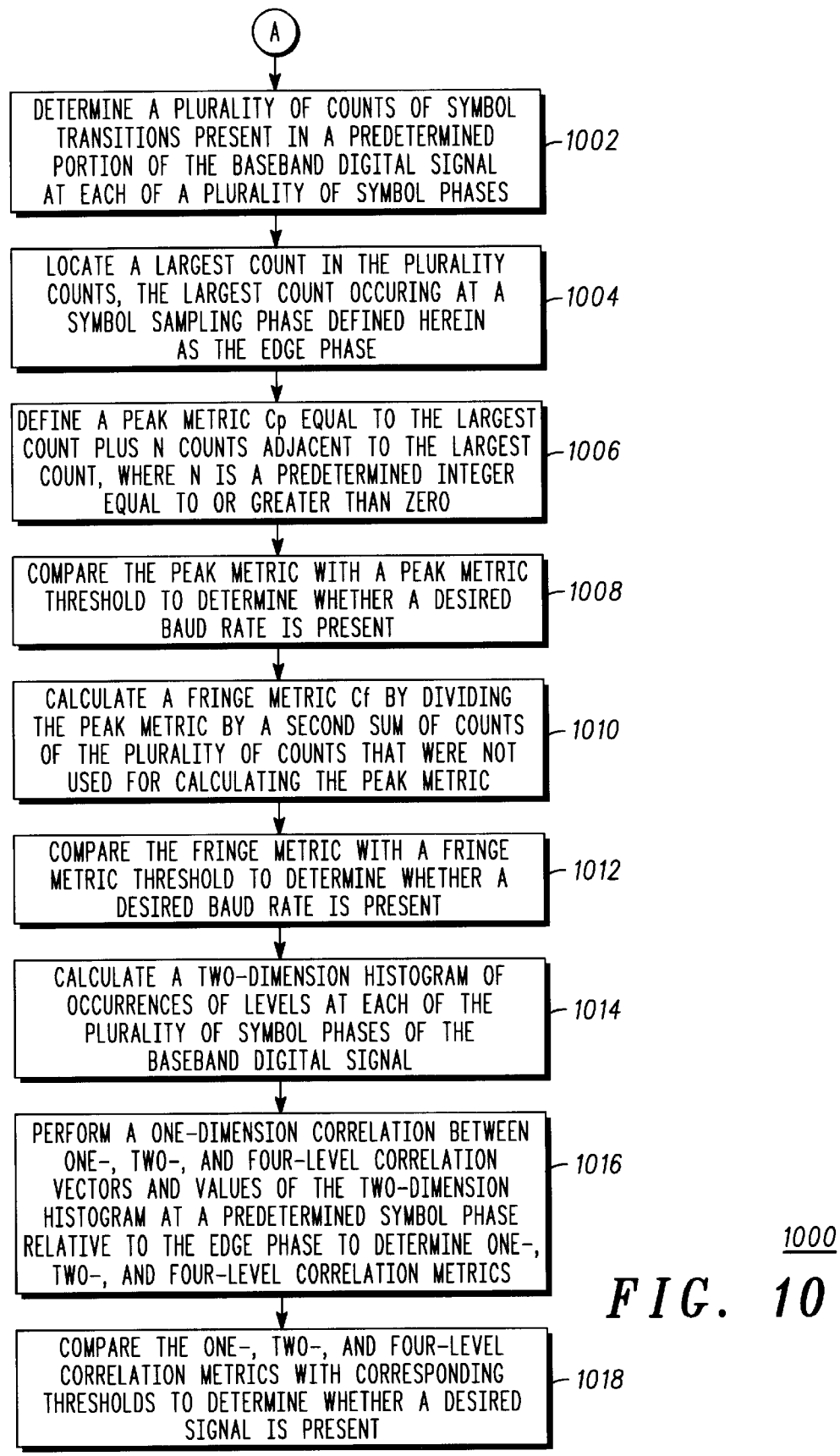

FIGS. 9 and 10 are flow diagrams 900, 1000 summarizing operation of the signal classifier in accordance with the present invention. Referring to FIG. 9, at step 902 the processor 202 cooperates with the receiver front end 102 to receive the baseband signal 206. The processor 202 then digitizes 904 the baseband signal, thereby generating a baseband digital signal. The processor 202 delays 906 the baseband digital signal by a symbol duration, thereby generating a delayed baseband digital signal, and adds 908 the baseband digital signal to the delayed baseband digital signal, thereby generating a summed signal. The processor divides 910 the summed signal by two, thereby generating a threshold signal, and delays 912 the baseband digital signal by one-half the symbol duration, thereby generating a half-delayed signal. The processor 202 subtracts 914 the threshold signal from the half-delayed signal, thereby generating a candidate signal, and searches 916 for a zero crossing in the candidate signal. When the processor 202 finds a zero crossing, it generates 918 a pulse in response.

The processor 202 also subtracts 920 the delayed baseband digital signal from the baseband digital signal, thereby generating a difference signal, and computes 922 an absolute value of the difference signal. The processor compares 924 the absolute value of the difference signal with a predetermined threshold, and allows 926 the pulse to be output only when the absolute value of the difference signal is greater than the predetermined threshold. Flow then moves to step 1002 (FIG. 10).

After processing a predetermined portion, e.g., samples from 30 msec, of the baseband digital signal, the processor 202 determines a plurality of counts of symbol transitions (from the output pulses of the edge detector 300) present in said predetermined portion of the baseband digital signal at each of a plurality of symbol sampling phases. The plurality of counts form the edge histogram 500, 600. The processor 202 then locates 1004 a largest count, or peak, in the plurality of counts, the largest count occurring at a symbol sampling phase defined herein as the edge phase. The processor 202 then defines 1006 the peak metric Cp to be equal to the largest count plus N counts adjacent to the largest count, where N is a predetermined integer equal to or greater than zero, as described herein above. The processor 202 compares 1008 the peak metric with the peak metric threshold TCp to determine whether the desired baud rate is present.

The processor 202 also calculates 1010 the fringe metric Cf by dividing the peak metric Cp by a second sum of counts of the plurality of counts that were not used for calculating the peak metric, and compares 1012 the fringe metric Cf with the fringe metric threshold TCp to determine whether the desired baud rate is present. This comparison advantageously prevents falsing on noise, because noise generates more evenly distributed edge counts across all sampling phases than does a signal at the desired baud rate. Noise thus produces a relatively low value for Cf.

The processor 202 calculates 1014 in parallel a two-dimension histogram of occurrences of levels at each of the plurality of symbol sampling phases of the baseband digital signal. The levels, for example, can represent symbol frequencies in a system using frequency-shift-keyed modulation. The processor 202 then performs 1016 a one-dimension correlation between one-, two-, and four-level correlation vectors and values of the two-dimension histogram at a predetermined symbol sampling phase relative to the edge phase, e.g., at a sampling phase one-half the symbol duration earlier than the edge phase, to determine the one-, two-, and four-level correlation metrics C1, C2, and C4. The processor 202 then compares the one-, two-, and four-level correlation metrics with corresponding thresholds to determine whether the desired signal is present.

Thus, it should be clear from the preceding disclosure that the present invention advantageously provides a method and apparatus in a signal classifier for facilitating a classification of a baseband signal. The method and apparatus advantageously requires no peak and valley detector, detects all transitions accurately without smearing, does not false on noise, and helps minimize the computation required for level detection.

Many modifications and variations of the present invention are possible in light of the above teachings. For example, the present invention is applicable to any baud rate, any number of modulation levels, and many different types of modulation. Thus, it is to be understood that, within the scope of the appended claims, the invention can be practiced other than as specifically described herein above.

What is claimed is:

1. A method in a signal classifier for facilitating a classification of a baseband digital signal, the method comprising the steps of:
   receiving the baseband digital signal;
   delaying the baseband digital signal by a symbol duration, thereby generating a delayed baseband digital signal;
   adding the baseband digital signal to the delayed baseband digital signal, thereby generating a summed signal;
   dividing the summed signal by two, thereby generating a threshold signal;
   delaying the baseband digital signal by one-half the symbol duration, thereby generating a half-delayed signal;
   subtracting the threshold signal from the half-delayed signal, thereby generating a candidate signal;
   searching for a zero crossing in the candidate signal; and
   generating a pulse in response to finding the zero crossing.

2. The method of claim 1, further comprising the steps of:
   subtracting the delayed baseband digital signal from the baseband digital signal, thereby generating a difference signal;
   computing an absolute value of the difference signal;
   comparing the absolute value of the difference signal with a predetermined threshold; and
   allowing said pulse to be output only when the absolute value of the difference signal is greater than the predetermined threshold.

3. The method of claim 2, further comprising the steps of:
   determining a plurality of counts of symbol transitions present in a predetermined portion of the baseband digital signal at each of a plurality of symbol sampling phases;
   locating a largest count in the plurality of counts, the largest count occurring at a symbol sampling phase defined as an edge phase;
   defining a peak metric equal to the largest count plus N counts adjacent to the largest count, where N is a predetermined integer equal to or greater than zero; and
   comparing the peak metric with a peak metric threshold to determine whether a desired baud rate is present.

4. The method of claim 3, further comprising the steps of:
   calculating a fringe metric by dividing the peak metric by a second sum of counts of the plurality of counts that were not used for calculating the peak metric; and
   comparing the fringe metric with a fringe metric threshold to determine whether a desired baud rate is present.

5. The method of claim 3, further comprising the steps of:
   calculating a two-dimension histogram of occurrences of levels at each of the plurality of symbol sampling phases of the baseband digital signal;
   performing a one-dimension correlation between one-, two-, and four-level correlation vectors and values of the two-dimension histogram at a predetermined symbol sampling phase relative to said edge phase to determine one-, two-, and four-level correlation metrics; and
   comparing the one-, two-, and four-level correlation metrics with corresponding thresholds to determine whether a desired signal is present.

6. A signal classifier for facilitating a classification of a baseband signal, the signal classifier comprising:
   a processor for receiving and processing the baseband signal, wherein the processor is arranged and programmed to:
   digitize the baseband signal, thereby generating a baseband digital signal;
   delay the baseband digital signal by a symbol duration, thereby generating a delayed baseband digital signal;
   add the baseband digital signal to the delayed baseband digital signal, thereby generating a summed signal;
   divide the summed signal by two, thereby generating a threshold signal;
   delay the baseband digital signal by one-half the symbol duration, thereby generating a half-delayed signal;
   subtract the threshold signal from the half-delayed signal, thereby generating a candidate signal;
   search for a zero crossing in the candidate signal; and
   generate a pulse in response to finding the zero crossing.

7. The signal classifier of claim 6, wherein the processor is further programmed to:
   subtract the delayed baseband digital signal from the baseband digital signal, thereby generating a difference signal;
   compute an absolute value of the difference signal;
   compare the absolute value of the difference signal with a predetermined threshold; and
   allow said pulse to be output only when the absolute value of the difference signal is greater than the predetermined threshold.

8. The signal classifier of claim 7, wherein the processor is further programmed to:

determine a plurality of counts of symbol transitions present in a predetermined portion of the baseband digital signal at each of a plurality of symbol sampling phases;

locate a largest count in the plurality of counts, the largest count occurring at a symbol sampling phase defined as an edge phase;

define a peak metric equal to the largest count plus N counts adjacent to the largest count, where N is a predetermined integer equal to or greater than zero; and compare the peak metric with a peak metric threshold to determine whether a desired baud rate is present.

9. The signal classifier of claim 8, wherein the processor is further programmed to:

calculate a fringe metric by dividing the peak metric by a second sum of counts of the plurality of counts that were not used for calculating the peak metric; and compare the fringe metric with a fringe metric threshold to determine whether a desired baud rate is present.

10. The signal classifier of claim 8, wherein the processor is further programmed to:

calculate a two-dimension histogram of occurrences of levels at each of the plurality of symbol sampling phases of the baseband digital signal;

perform a one-dimension correlation between one-, two-, and four-level correlation vectors and values of the two-dimension histogram at a predetermined symbol sampling phase relative to said edge phase to determine one-, two-, and four-level correlation metrics; and compare the one-, two-, and four-level correlation metrics with corresponding thresholds to determine whether a desired signal is present.

11. A receiver for facilitating a classification of a baseband signal, the receiver comprising:

a receiver front end for down-converting a received modulated signal to produce the baseband signal; and a signal classifier for facilitating a classification of the baseband signal, the signal classifier comprising:

a processor for receiving and processing the baseband signal, wherein the processor is arranged and programmed to:

digitize the baseband signal, thereby generating a baseband digital signal;

delay the baseband digital signal by a symbol duration, thereby generating a delayed baseband digital signal;

add the baseband digital signal to the delayed baseband digital signal, thereby generating a summed signal;

divide the summed signal by two, thereby generating a threshold signal;

delay the baseband digital signal by one-half the symbol duration, thereby generating a half-delayed signal;

subtract the threshold signal from the half-delayed signal, thereby generating a candidate signal;

search for a zero crossing in the candidate signal; and generate a pulse in response to finding the zero crossing.

12. The receiver of claim 11, wherein the processor is further programmed to:

subtract the delayed baseband digital signal from the baseband digital signal, thereby generating a difference signal;

compute an absolute value of the difference signal;

compare the absolute value of the difference signal with a predetermined threshold; and allow said pulse to be output only when the absolute value of the difference signal is greater than the predetermined threshold.

13. The receiver of claim 12, wherein the processor is further programmed to:

determine a plurality of counts of symbol transitions present in a predetermined portion of the baseband digital signal at each of a plurality of symbol sampling phases;

locate a largest count in the plurality of counts, the largest count occurring at a symbol sampling phase defined as an edge phase;

define a peak metric equal to the largest count plus N counts adjacent to the largest count, where N is a predetermined integer equal to or greater than zero; and compare the peak metric with a peak metric threshold to determine whether a desired baud rate is present.

14. The receiver of claim 13, wherein the processor is further programmed to:

calculate a fringe metric by dividing the peak metric by a second sum of counts of the plurality of counts that were not used for calculating the peak metric; and compare the fringe metric with a fringe metric threshold to determine whether a desired baud rate is present.

15. The receiver of claim 13, wherein the processor is further programmed to:

calculate a two-dimension histogram of occurrences of levels at each of the plurality of symbol sampling phases of the baseband digital signal;

perform a one-dimension correlation between one-, two-, and four-level correlation vectors and values of the two-dimension histogram at a predetermined symbol sampling phase relative to said edge phase to determine one-, two-, and four-level correlation metrics; and compare the one-, two-, and four-level correlation metrics with corresponding thresholds to determine whether a desired signal is present.

* * * * *